US010158995B2

United States Patent
Hillier et al.

(10) Patent No.: US 10,158,995 B2
(45) Date of Patent: Dec. 18, 2018

(54) PERSONAL AREA NETWORK SYSTEM AND METHOD

(71) Applicants: Peter Matthew Hillier, Ottawa (CA); Katayoun Hillier, Ottawa (CA)

(72) Inventors: Peter Matthew Hillier, Ottawa (CA); Katayoun Hillier, Ottawa (CA)

(73) Assignee: Mitel Networks Corporation, Ottawa, Ontario (CA)

(*) Notice: Subject to any disclaimer, the term of this patent is extended or adjusted under 35 U.S.C. 154(b) by 158 days.

(21) Appl. No.: 14/315,117

(22) Filed: Jun. 25, 2014

(65) Prior Publication Data
US 2015/0382196 A1 Dec. 31, 2015

(51) Int. Cl.
| | | |
|---|---|---|
| H04W 4/00 | (2018.01) | |
| *H04W 12/08* | (2009.01) | |
| *H04W 4/80* | (2018.01) | |
| *H04W 12/04* | (2009.01) | |
| H04W 84/12 | (2009.01) | |
| H04W 88/08 | (2009.01) | |
| H04W 12/06 | (2009.01) | |

(52) U.S. Cl.
CPC .......... *H04W 12/08* (2013.01); *H04W 4/80* (2018.02); *H04W 12/04* (2013.01); *H04W 12/06* (2013.01); *H04W 84/12* (2013.01); *H04W 88/08* (2013.01)

(58) Field of Classification Search
CPC ......... H04W 4/008; H04W 4/02; H04W 4/04; H04W 12/08; H04W 76/021; H04W 88/08
See application file for complete search history.

(56) References Cited

U.S. PATENT DOCUMENTS

| | | | |
|---|---|---|---|
| 7,551,577 B2* | 6/2009 | McRae ................ | H04W 88/06 370/328 |
| 7,724,704 B2 | 5/2010 | Simons et al. | |
| 8,978,119 B2* | 3/2015 | Cao ....................... | H04L 63/08 726/7 |
| 2012/0079123 A1 | 3/2012 | Brown et al. | |
| 2012/0127942 A1 | 5/2012 | Cook et al. | |
| 2012/0282967 A1* | 11/2012 | Subramaniam ....... | H04W 84/22 455/517 |
| 2012/0317619 A1* | 12/2012 | Dattagupta ........... | H04W 12/08 726/4 |
| 2013/0007858 A1* | 1/2013 | Shah .................. | H04L 63/0815 726/6 |
| 2013/0212661 A1* | 8/2013 | Neafsey ................ | G06F 21/45 726/6 |
| 2013/0237148 A1* | 9/2013 | McCann ................ | H04W 4/02 455/41.1 |
| 2013/0283050 A1 | 10/2013 | Gupta et al. | |
| 2014/0075523 A1 | 3/2014 | Tuomaala et al. | |
| 2014/0126356 A1* | 5/2014 | Lee ................... | H04L 41/0663 370/228 |

(Continued)

FOREIGN PATENT DOCUMENTS

WO    WO 2014/089242 A1    6/2014

*Primary Examiner* — Linglan E Edwards

(57) ABSTRACT

An exemplary system includes a mobile device having an application and wireless access user credentials, a configurable access point of a network, and a terminal connected to the configurable access point. The wireless access user credentials can be pushed, using the application, from the first mobile device to the terminal to reconfigure the access point and create a virtual network that recognizes the wireless access user credentials.

19 Claims, 2 Drawing Sheets

(56) References Cited

U.S. PATENT DOCUMENTS

Figure 1:
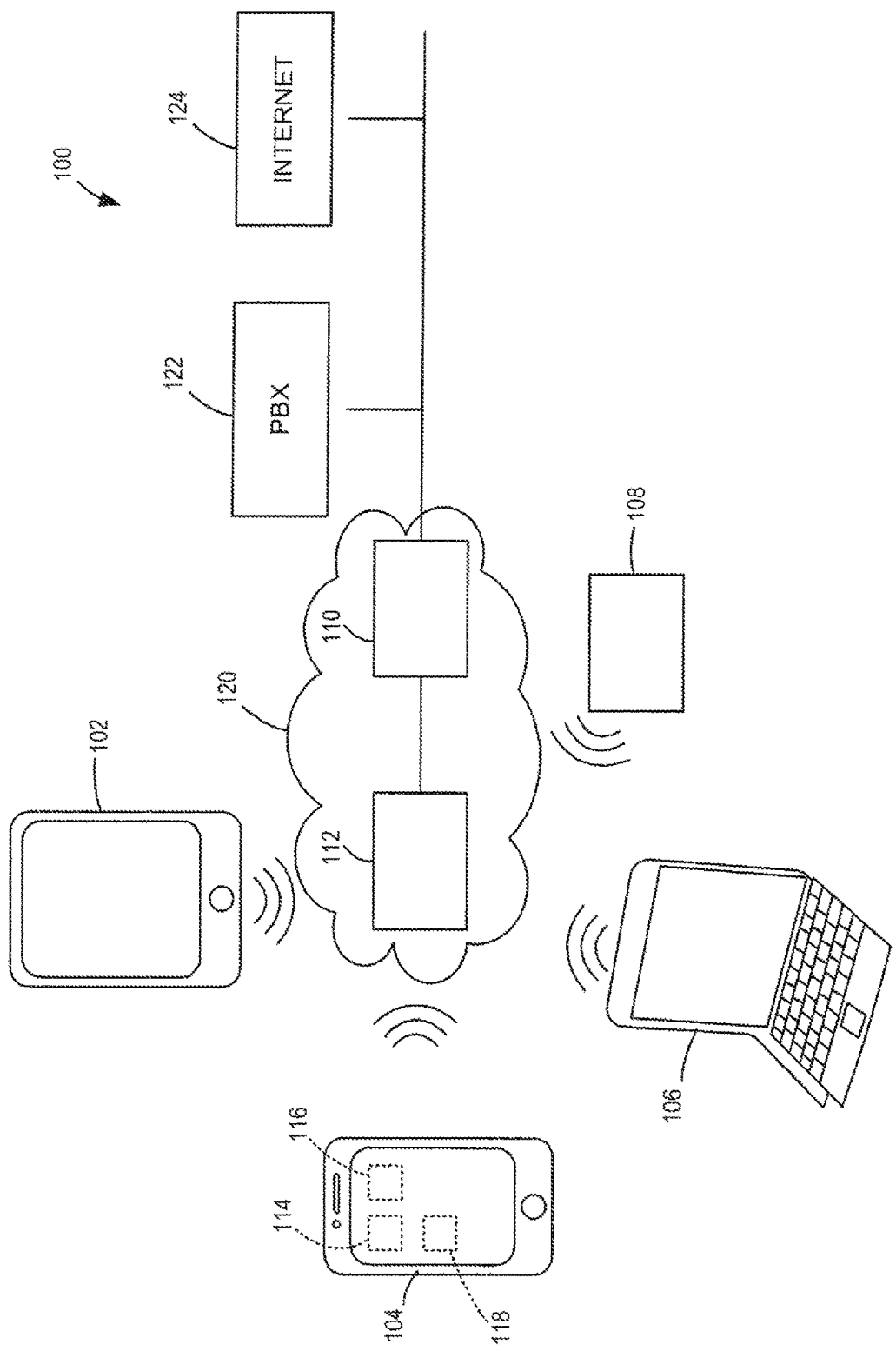

| | | | | |
|---|---|---|---|---|
| 2014/0162600 A1* | 6/2014 | Chang | ................... | H04W 12/06 |
| | | | | 455/411 |
| 2014/0250513 A1* | 9/2014 | Cao | ........................ | H04L 63/08 |
| | | | | 726/7 |
| 2015/0142947 A1* | 5/2015 | Dyba | .................. | H04L 41/0853 |
| | | | | 709/224 |
| 2015/0281966 A1* | 10/2015 | Griot | .................... | H04W 12/08 |
| | | | | 726/5 |
| 2015/0327060 A1* | 11/2015 | Gilson | .................. | H04W 76/10 |
| | | | | 726/7 |

\* cited by examiner

PERSONAL AREA NETWORK SYSTEM AND METHOD

FIELD OF THE INVENTION

The present disclosure generally relates to electronic communication systems and methods. More particularly, exemplary embodiments of the disclosure relate to personal area networks, systems including the networks, and methods of using the networks and systems.

BACKGROUND OF THE INVENTION

Wireless networks, such as WiFi networks provide a convenient means to connect one or more mobile devices to a network. However, such networks are generally less secure than wired networks, because connection to the network does not require a wired connection. To mitigate security risks associated with wireless networks, security protocols, such as wired equivalent privacy (WEP), WiFi protected access (WPA) and WiFi protected access II (WPA2) have been developed. Such protocols generally require that a user desiring to access a wireless network enter a password and other credentials to access the wireless network.

Users often take one or more mobile devices with them as they leave the office or house. When traveling, for example, each user carries an average of about 1.8 mobile devices, and this number is thought to increase with time.

Trying to connect the one or more mobile devices to a network access point, such as a hotspot in a hotel, on a cruise ship, at a meeting, or the like, may be cumbersome and difficult. For example, for a user to access the wireless network, a user may have to obtain and then meticulously enter a username and password onto each device the user desires to connect to the network. Such usernames and/or passwords may periodically change, thus requiring a user to again obtain and enter such credentials. Additionally, it may be difficult or impossible for devices without browser capabilities to join such access points.

Several attempts to simplify the process of adding devices to WiFi networks have been attempted. In 2006, the WiFi Alliance released a protocol named WiFi Simple Config (now known as WiFi Protected Setup) with the goal of simplifying the management of home networks. This protocol deals specifically with adding a new device into an existing network, and it is believed that this is the fundamental issue with all such designs. Trying to add devices to an existing network introduces security issues, as have recently been well documented with WiFi Protected Setup. It can also become repetitive for multiple devices and users, and is highly dependent upon all device systems supporting the simplified protocol.

Accordingly, improved methods and systems for quickly and easily connecting one or more mobile devices to a wireless network are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

Figure 2:
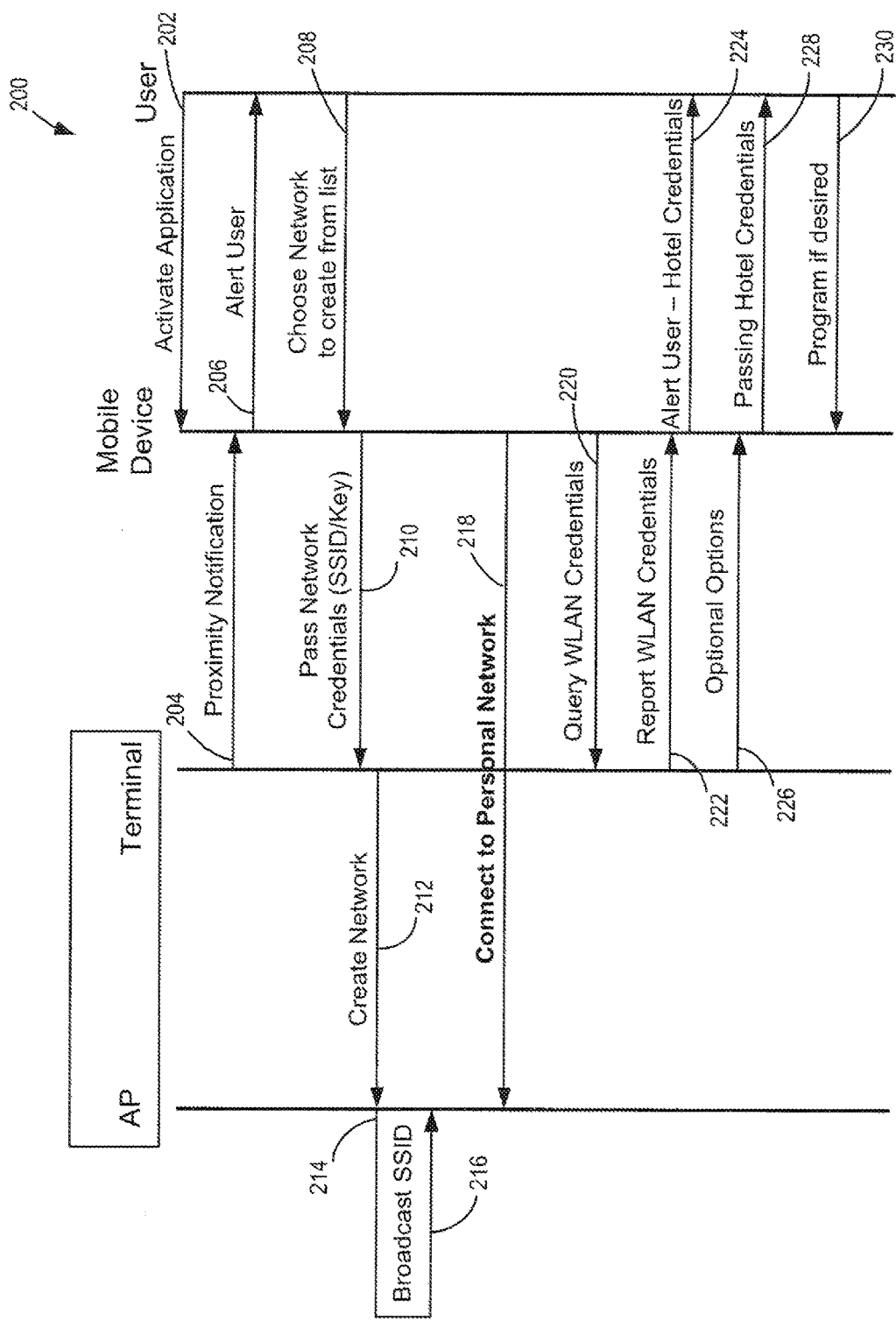

FIG. 1 illustrates a wireless network system in accordance with exemplary embodiments of the disclosure; and FIG. 2 illustrates a method of accessing a wireless network in accordance with further exemplary embodiments of the disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

The disclosure describes exemplary networks, systems, and methods. As set forth in more detail below, exemplary networks, systems and methods described herein may be conveniently used in hospitality settings, such as hotels, college or other campuses, cruise ships, and at conferences. However, the disclosure is not limited to such applications.

Exemplary networks, systems and methods allow users to provide known, previously used, and/or easily entered network credentials (referred to herein as wireless access user credentials) to a configurable access point of a network, such that the users can easily connect one or more mobile devices to a network. Thus, rather than entering credentials associated with, for example, a hotspot, such as a hotspot within a hotel, on a cruise ship, or the like, users use their own (e.g., previously known or used) wireless access user credentials to reconfigure the hotspot—e.g., to create a virtual network that replicates a user's network, so that the user and all his/her devices can easily access a network, without having to obtain and then tediously enter cumbersome credentials, such as a username and password associated with the hotspot, into all devices individually. In addition, even user devices that do not have browser capabilities can easily access the network.

In accordance with exemplary embodiments of the disclosure, proximity devices, such as those that use Near Field Communication, Bluetooth® low energy, Bluetooth, Infrared technology, or similar devices can be used to receive the wireless access user credentials and pass the wireless access user credentials to a configurable access point of a network. Using proximity devices to receive the wireless access user credentials provides additional security for the configurable access point and the network, because only devices that are proximate a proximity device can pass the wireless access user credentials and join the network. Alternatively, a cloud service or other external internet connection (e.g., LTE) could be used to program a hotspot as well, provided there was some form of universally unique id associated with the hotspot. For example a QR code or other indicator on the hotspot could be used to trigger a connection to a cloud service that would allow the user to create the virtual personal network.

FIG. 1 illustrates a system 100 in accordance with exemplary embodiments of the disclosure. System 100 includes one or more mobile devices, such as devices 102-108, a network access point 110, and a terminal 112 coupled to access point 110. As illustrated, network access point 110 can form part of a network 120, such as a wireless local area network (WLAN), which in turn, can be coupled to one or more other networks, such as a private branch exchange 122, and/or the Internet 124.

Mobile devices 102-108 can include any suitable device with wireless 120 communication features. For example, mobile devices can include a tablet computer (102), a smart phone (104), a personal (e.g., laptop) computer (106), a streaming device (108), such as a game console or other media streaming device, such as Roku®, Amazon Fire™ TV, or the like, or any other mobile device that includes wireless communication capabilities, such as WiFi. In accordance with some exemplary aspects of various embodiments of the disclosure, at least one mobile device 102-108 includes a proximity-based device 114 (e.g., a short-range transmitter/receiver) for short-range wireless transmission of information between the mobile device (e.g., device 104) and terminal 112, client application software 116, and wireless access user credentials 118. In the context of this disclosure, short-range means a distance of, for example, about 100 m, about 10 m, or about 1 m in the case of Bluetooth devices, about two feet or less, about one foot or less, or about 4 cm or less in the case of Near Field Communication and Infrared technology devices. Proximity-based device 114 is used to pass wireless access user credentials to terminal 112, such that access point 110 can be reconfigured to replicate a network known to one or more of mobile devices 102-108. In these cases, the proximity device can be used to confirm the user is proximate the access point, before the access point can be programmed to contain the user's personal network information. As mentioned above, proximity devices are well suited for this, but some other method could be used such as location (GPS, carrier triangulation, or the like) to pinpoint user and associated user location with the access point. The access point itself could emit a code in service set identifier (SSID) that uniquely identifies the access point—this could then be picked up by a mobile device and transmitted to a cloud service (over carrier data connection) to reprogram the access point remotely, and then the mobile device and other devices can join locally over the new personal network.

Configurable access point 110 provides wireless access to a network, such as a wired (e.g., Ethernet) network. Configurable access point 110 can plug into or be integrated with a hub, switch, or wired router. In accordance with various aspects of exemplary embodiments of the disclosure, configurable access point 110 is configured to dynamically reprogram itself to replicate a network, such as a wireless local-area network known to one or more mobile devices 102-108. For example, configurable access point can receive wireless access user credentials from one or more mobile devices 102-108 and replicate a user's WLAN or personal area network based on the wireless access user credentials, such that configurable access point uses, for example, SSID previously known to the user and/or mobile device 102-108. In accordance with some examples, a user can choose to hide the SSID and/or other security attributes. The user's known wireless access user credentials can then be used to access a network, such as network 120. Once configurable access point 110 is reprogrammed to replicate a network known to a mobile device, a mobile device (e.g., one or more of mobile devices 102-108) can connect to network 120 without any additional programming to the mobile device. In accordance with these examples, any mobile device with wireless communication (e.g., WiFi) can connect to network 120.

An exemplary configurable access point 110 can create multiple wireless networks using the same radio (e.g., WiFi) device. In this case, configurable access point 110 can include, a network identifier (e.g., SSID) for a personal area network that is configurable using the wireless access user credentials and a network identifier (e.g., SSID) for a local network (e.g., WLAN), such as a WLAN associated with a hospitality service, such as a hotel, cruise ship, conference center, or the like. The WLAN network credential can remain intact and the personal area network can form part of the WLAN—or be overlaid onto the WLAN. In the context of a hotel setting, a personal area network can be associated with each room or multiple rooms proximate each other. The WLAN can service part or all of the hotel rooms, or may be accessible only in public areas, such as the lobby.

When access point 110 includes or forms part of multiple wireless networks, such as a personal area network and a WLAN, different data priority can be given to data transmitted over the personal area network, compared to data transmitted over the WLAN. Further, a surcharge can be applied for access to the personal area network, relative to access to the WLAN. Additionally or alternatively, data transmitted over the personal area network can have a different (e.g., higher) priority, relative to data transmitted over the WLAN. The personal area network can be used, for example, to stream video or other high band-width data.

Configurable access point 110 and/or terminal 112 can also push network (e.g., network 120) credentials to one or more mobile devices 102-108. This allows the mobile devices 102-108 to connect to other access points of network 120 without requiring manual entry of network 120 credentials, such that a wireless supplicant can be created by the mobile device.

Alternatively, a mobile device, such as one or more of mobile devices 102-108 can exchange a set of media access control (MAC) addresses to enable access point 110 to provide, for example, an unsecure network using MAC address filtering. In this case a mobile device can form a bond with access point 110, such that application 116 on the mobile device receives a notification (e.g., a request for approval) when other MAC addresses attempt to gain access to access point 110.

Configurable access points for use in accordance with various embodiments of the disclosure can be configured to reset or delete wireless access user credentials after a period of time or upon an event, such as a checkout. Or, a user can select, e.g., using application 116, to remove the wireless access user credentials from configurable access point 110.

In accordance with exemplary embodiments of the disclosure, terminal 112 includes a device capable of short-range wireless communication with one or more mobile devices 102-108. Terminal 112 may be integrated with one or more other devices, such as access point 110, a smart television, a desk-top phone, or the like. Suitable short-range device protocols for communication between a mobile device (e.g., one or more of mobile devices 102-108) and device 112 include Near Field Communication (NFC), Bluetooth, Bluetooth low energy, Infrared technology, and the like. The short communication range adds security to the information transmission, because information can only be transferred between devices (e.g., mobile device 104 and terminal 112) when the devices are close enough (e.g., less than about 100 m) to receive a transmission from the other device. For example, Bluetooth low energy can require proximity as close as 1 cm, or as far as 100 m.

Terminal 112 can be located, for example, in a room, such as a hotel or cruise ship room, in a conference location, or the like. Location of terminal 112 within a room can provide an association between a user, the room, and access point 110, since, in at least some cases, only those with access to or near the room would have access to the access point.

Network 120 may include a local area network (LAN), a wide area network, a personal area network, a campus area network, a metropolitan area network, a global area network, or the like. Network 120 may be coupled to configurable access point 110 using an Ethernet connection, other wired connections, a WiFi interface, other wireless interfaces, or the like. Network 120 may be coupled to other networks, such as a private branch exchange (PBX) 122 network, to other devices typically coupled to network, and/or to Internet 124. Network 120 is conveniently illustrated with one configurable access point 110. However, network 120 can include any suitable number of configurable and/or non-configurable access points. When network 120 includes more than one configurable access point, a user can connect one or more mobile devices to the additional configurable access points using the techniques described herein.

In accordance with various exemplary embodiments of the disclosure, system 100 includes one or more additional configurable access points. The additional configurable access point(s) allow the network connection to automatically remain intact or to be reestablished as the user roams—e.g., through a building or other area covered by the additional configurable access point(s). Once a user pairs a mobile device for a first time, the user credentials are then trusted, and as the user moves around, the user's virtual network gets replicated on the closest configurable access point. In these cases, the user's virtual personal area network exists around the user (e.g., within WiFi range of an access point of a network), but not over the entire main network.

Exemplary methods of accessing a wireless network in accordance with the disclosure include the steps of providing a first mobile device including an application and wireless access user credentials, providing a configurable access point of a network, providing a terminal connected to the configurable access point, using the application, selecting the wireless access user credentials to obtain selected wireless access user credentials, establishing a connection to the configurable access point using the terminal; and forming a virtual network on the configurable access point using the selected wireless access user credentials. The first mobile device can connect to the network using the wireless access user credentials. Proximity-based protocols, such as Near Field Communication, Bluetooth low energy, Bluetooth, and Infrared technology, and proximity-based devices can be used to transfer wireless access user credentials and/or network credentials between the first mobile device and the configurable access point. Multiple mobile devices can be connected to the configurable access point after it has been configured to replicate a user's known network. FIG. 2 illustrates a method 200 suitable for use with various exemplary methods.

As illustrated in FIG. 2, method 200 includes a step of a user activating an application on a mobile device (step 202). The application can be specific to a hospitality provider, such as a hotel chain, cruise ship line, or the like, or can be a stand-alone application.

During step 204, a terminal—e.g., connected to and/or integral with an access point, can send a signal to a mobile device when a mobile device is within range of the terminal. During step 206, a user receives the alert.

During step 208, a user can select network credentials to use. For example, a user may select home or office or a temporary wireless access user credentials to use. A user could also create a network—e.g., specifically for travel usage—using a mobile phone network identifier (e.g., SSID) and passphrase, such that home or office credentials do not need to be used. Alternatively, a user may select a network to use prior to receiving an alert from a terminal.

Once the desired wireless access user credentials are selected, if the mobile device is not within range of the terminal, the device is moved within range of the terminal, such that the wireless access user credentials can be pushed from the mobile device (e.g., using the application) to the terminal (step 210), which in turn pushes the wireless access user credentials to the configurable access point (step 212). Alternatively, a cloud service can receive the wireless access user credentials and optionally an additional identifier, such as a room number, and the configuration service can use this information to identify the correct access point to reconfigure. In this case, a user can connect to the network using carrier data and enter the wireless access user credentials, for example, via a web page.

At step 214, the configurable access point configures (also referred to herein as reconfigures) itself to form an additional virtual network (e.g., having the same SSID as the network selected by a user during step 208) on the access point which the same security parameters as the network selected by the user during step 208. At step 216, the network identification (e.g., SSID) is broadcast.

At step 218, one or more user devices can connect to the access point using the wireless access user credentials selected during step 208. A device that was not used to reconfigure the access point may have a user select network credential to be used to connect to the access point and/or be prompted to connect to the network, whose identification is broadcast during step 216.

Exemplary methods can also include additional steps that allow the configurable access point and/or terminal to pass network credentials (e.g., WLAN credentials) to a mobile device. This allows a wireless network profile to be created on a mobile device (either automatically or manually), such that the device can connect to the main network (e.g., WLAN)—for example when the mobile device is out of reach of the personal area network established during steps 202-218. In accordance with some embodiments, only mobile devices, such as phones, tablets, personal computers, and the like are provisioned with the network credentials, and devices that will only be used proximate the access point (i.e., within range of the access point) are not provisioned with the main network credentials.

Such optional steps are illustrated as step 220-230 in FIG. 2. At step 220, a mobile device queries a terminal or an access point for WLAN credentials (e.g., a hotel's WiFi credentials). The query can be initiated by placing the mobile device proximate the terminal. At step 222, the WLAN credentials are reported or pushed to the mobile device.

As noted above, networks can include a plurality of configurable and/or non-configurable access points. Once a user configures a personal area network on a configurable access point, the user can take one or more mobile devices to other areas within the network and dynamically or automatically connect to other configurable access points via a personal area network when available or to a WLAN when a configurable personal area network access point is not available.

Although exemplary networks, methods and systems have been described above in connection with hospitality settings, such as hotel rooms, and cruise ship rooms, the disclosure is not so limited. The methods and systems described herein can be used for other applications, including, for example, conference room settings. In this case multiple users from an organization, such as a company or a group, can create a temporary personal area network using the organization's wireless access user credentials. This allows members from the same organization to connect to a wireless network without obtaining a pre-shared key (PSK) from the network provider.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

We claim:

1. A personal area network system, the system comprising:
   a first mobile device comprising an application and wireless access user credentials;
   a configurable access point of a network providing a network hotspot broadcasting an identifier of a first virtual network; and
   a terminal connected to the configurable access point,
   wherein the wireless access user credentials are pushed, using the application, from the first mobile device to the terminal,
   wherein the configurable access point uses the wireless access user credentials to reconfigure the hotspot to form a second virtual network that replicates a network known to the first mobile device, such that the configurable access point broadcasts an identifier of the second virtual network, and
   wherein, in response to receiving the broadcasted identifier of the second virtual network, the first mobile device connects to the second virtual network of the reconfigured hotspot using the wireless access user credentials.

2. The personal area network system of claim 1, wherein the terminal uses a proximity-based protocol to receive information from the first mobile device.

3. The personal area network system of claim 2, wherein a cloud service is used to reconfigure the access point.

4. The personal area network system of claim 1, wherein the hotspot has virtual network security parameters based on a user's selected network security parameters.

5. The personal area network system of claim 1, wherein the system further comprises a second mobile device comprising the wireless access user credentials, and wherein the second mobile device connects to the virtual network using the wireless access user credentials.

6. The personal area network system of claim 1, wherein the wireless access user credentials comprise one or more of service set identifier, user name, and password.

7. The personal area network system of claim 1, wherein the terminal passes network credentials to the first mobile device.

8. The personal area network system of claim 1, wherein the wireless access user credentials comprise a MAC address.

9. The personal area network system of claim 1, wherein the configurable access point supports a plurality of wireless networks.

10. The personal area network system of claim 1, wherein the configurable access point comprises personal service set identification information and local service set identification information.

11. The personal area network system of claim 10, wherein a priority of data transmitted using the personal service set identification information differs from a priority of data transmitted using the local service set identification information.

12. The personal area network system of claim 1, wherein a user uses the application to select the wireless access user credentials.

13. The personal area network system of claim 1, wherein the configurable access point and the terminal are integrated into a single device.

14. The personal area network system of claim 1, wherein the terminal comprises a smart device.

15. A method of accessing a wireless network having a first mobile device comprising an application and wireless access user credentials, a configurable access point of a network providing a network hotspot broadcasting an identifier of a first virtual network, and a terminal connected to the configurable access point, the method comprising the steps of:
   selecting, from the application, the wireless access user credentials to obtain selected wireless access user credentials;
   establishing a connection to the configurable access point using the terminal;
   reconfiguring the hotspot using the selected wireless access user credentials to form a second virtual network that replicates a network that is known to the first mobile device, such that the configurable access point broadcasts an identification of the second virtual network; and
   in response to receiving the broadcasted identifier of the second virtual network, connecting the first mobile device to the second virtual network of reconfigured hotspot using the selected wireless access user credentials.

16. The method of accessing a wireless network of claim 15, wherein the step of establishing a connection to the configurable access point comprises using one or more protocols selected from the group consisting of Near Field communication, Bluetooth low energy, Bluetooth, and Infrared technology.

17. The method of accessing a wireless network of claim 15, further comprising a step of connecting a second mobile device to the network using the selected wireless access user credentials.

18. The method of accessing a wireless network of claim 15, further comprising a step of transmitting network credentials to the first mobile device.

19. A wireless network system, the system comprising:
   a first mobile device comprising an application and wireless access user credentials; and
   a configurable access point of a network providing a network hotspot broadcasting an identifier of a first virtual network,
   wherein the wireless access user credentials are pushed, using the application, from the first mobile device to the configurable access point,
   wherein the configurable access point uses the wireless access user credentials to reconfigure the hotspot to form a second virtual network that replicates a network known to the first mobile device, such that the configurable access point broadcasts an identification of the second virtual network; and wherein the first mobile device connects to the second virtual network of reconfigured hotspot in response to receiving the broadcasted identifier of the second virtual network using the wireless access user credentials.

\* \* \* \* \*